(12) United States Patent
Chivers et al.

(10) Patent No.: US 9,362,979 B2
(45) Date of Patent: Jun. 7, 2016

(54) ULTRA WIDEBAND TIME-DELAYED CORRELATOR

(71) Applicants: Mark A. Chivers, McKinney, TX (US); Sujit Ravindran, McKinney, TX (US)

(72) Inventors: Mark A. Chivers, McKinney, TX (US); Sujit Ravindran, McKinney, TX (US)

(73) Assignee: ABG Tag & Traq, LLC, Oklahoma City, OK (US)

( * ) Notice: Subject to any disclaimer, the term of this patent is extended or adjusted under 35 U.S.C. 154(b) by 0 days.

(21) Appl. No.: 14/714,680

(22) Filed: May 18, 2015

(65) Prior Publication Data
US 2015/0249481 A1 Sep. 3, 2015

Related U.S. Application Data

(63) Continuation-in-part of application No. 13/199,416, filed on Aug. 30, 2011.

(60) Provisional application No. 61/457,126, filed on Jan. 4, 2011.

(51) Int. Cl.
*H04B 1/7163* (2011.01)
*H04B 1/7176* (2011.01)

(52) U.S. Cl.
CPC .......... *H04B 1/71637* (2013.01); *H04B 1/7176* (2013.01); *H04B 1/71635* (2013.01)

(58) Field of Classification Search
CPC ........... H04B 1/71637; H04B 1/71635; H04B 10/66; H04B 1/709; H04B 1/7093; H04L 27/2331; H04L 7/042
USPC .......... 375/130, 260, 316, 343, 142–143, 147
See application file for complete search history.

(56) References Cited

U.S. PATENT DOCUMENTS

| | | | | |
|---|---|---|---|---|
| 5,974,042 A * | 10/1999 | Frank | ................... | H04B 7/2628 370/342 |
| 7,321,728 B2 * | 1/2008 | Harley | ................. | H04B 10/077 398/193 |
| 7,733,229 B2 | 6/2010 | Reunamaki | | |
| 7,746,962 B2 * | 6/2010 | DiRenzo | ................ | H04B 1/708 375/142 |
| 8,098,716 B2 * | 1/2012 | Goldberg | ........... | H04B 1/70752 375/150 |
| 8,363,769 B2 * | 1/2013 | Kondo | .................... | H04L 7/042 375/359 |
| 8,627,971 B2 | 1/2014 | Lancaster et al. | | |
| 2004/0223556 A1 | 11/2004 | Choi | | |
| 2005/0078735 A1 * | 4/2005 | Baker et al. | .................... | 375/130 |
| 2008/0130691 A1 | 6/2008 | Chen et al. | | |
| 2010/0232472 A1 | 9/2010 | Dallum et al. | | |
| 2010/0253565 A1 * | 10/2010 | Piesinger | ........................ | 342/29 |
| 2011/0163788 A1 | 7/2011 | Thibault | | |
| 2012/0170618 A1 * | 7/2012 | Chivers et al. | ................ | 375/150 |

* cited by examiner

*Primary Examiner* — Emmanuel Bayard
(74) *Attorney, Agent, or Firm* — William M. Hobby, III

(57) ABSTRACT

The present invention is for a method and apparatus to improve an ultra wideband (UWB) digital receiver's performance sensitivity. A transmitted signal stream has each data bit having multiple identical modulated pulses separated by a constant time interval. The received signal stream is applied to a plurality of signal processing groups where the original signal is duplicated in each processing group. The duplicated signal stream in each signal processing group is delayed by a different constant time interval between modulated pulses in the original signal stream and the two signal streams in each signal processing group is correlated and magnitude summed and combined to form a final signal stream which is detected to improve the sensitivity of the receiver.

14 Claims, 3 Drawing Sheets

ULTRA WIDEBAND TIME-DELAYED CORRELATOR

This patent application is a continuation-in-part application of my pending U.S. patent application Ser. No. 13/199,416, filed Aug. 30, 2011 which claims the benefit of Provisional Application No. 61/457,126, filed Jan. 4, 2011 for Ultra Wideband Time-Delayed Correlator.

BACKGROUND OF THE INVENTION

Ultra-wideband (UWB) communication systems employ very short pulses of electromagnetic radiation or impulses with short rise and fall times which results in a spectrum with a very wide bandwidth. UWB communications have a number of advantages over conventional systems. The very large bandwidth for instance facilitates very high data rate communications and since pulses of radiation are employed, the average transmit power may be kept low even though the power in each pulse is relatively large. Since the power in each pulse is spread over a large bandwidth the power per unit frequency may be very low, allowing UWB systems to coexist with other spectrum users and providing a low probability of intercept. UWB techniques are attractive for short range wireless devices, such as radio frequency identification (RFID) systems, because they allow devices to exchange information at relatively high data rates. For instance, an Ultra Wideband Radio Frequency Identification Technique system may be seen in the Reunamaki U.S. Pat. No. 7,733,229 in which UWB techniques are applied to RFID in which a reader generates a UWB IR interrogation signal and receives a UWB IR reply signal from an RFID tag in response to the interrogation signal.

Federal Communications Commission (FCC) defines a UWB pulse as one whose 10 dB bandwidth either is at least 500 MHz or whose fractional bandwidth is greater than 0.20. The 500 MHz minimum bandwidth limit sets a threshold at 2.5 GHz. Below this 2.5 GHz threshold signals are considered UWB if their fractional bandwidth exceeds 0.20, while above the threshold signals are UWB if their bandwidth exceeds 500 MHz. Fractional bandwidth is defined as the ratio of the 10 dB bandwidth to the center frequency. For example, a 500 MHz 10 dB bandwidth UWB signal centered at 6 GHz has a fractional bandwidth of 0.083 (500/6000). For UWB whose center frequency is greater than 2.5 GHz, the 500 MHz 10 dB analog bandwidth needs to be processed.

In our past U.S. Pat. No. 8,627,971, dated Jan. 14, 2014 for a Pulse-Level Interleaving for UWB Systems, a UWB transmitter transmits a multi-pulse per bit signal to a UWB receiver for multi-bit processing. A bit stream is transmitted using a plurality of UWB pulses for each bit frame. The pulse level interleaving of the pulses is accomplished prior to transmission of the signals by a plurality of UWB transmitters operating at the same time. The receiver de-interleaves the pulses and then aggregates the energy from the multiple pulses within each frame.

Other prior art patents and publications may be seen in the Dallum et al. U.S. Patent Application Publication No. 2010/0232472 for a UWB receiver which receives from a transmitter two identical impulses or RF burst packets that are spaced a fixed interval apart. An analog circuit amplifies both signals and sends them through two different paths. One path is non-delayed and the other path delays the incoming signal. The analog circuit's output signal is then digitized to produce a digital output. The front-end of this receiver is a standard architecture for a Super Heterodyne receiver. Dallum's invention transforms RF to digital by feeding a self-mixed output (multiplier output) to a comparator circuit which then produces a digital output. Dallum has a fixed receiver architecture.

The Thibault U.S. Patent Publication No. 2011/0163788 receives and duplicates an input signal and delays one of the signals relative to the other by the output pulse duration and combines the pulses to generate an output pulse of smaller duration than the input pulse duration. Thibault is adding two pulses of a finite duration together in an effort to create an output pulse that is of an even smaller duration. He is trying to create a short pulse from two larger pulses.

The Choi U.S. Patent Publication No. 2004/0223556 is a method for transferring and receiving ultra wideband signals using a differential phase shift keying scheme. The UWB transmitter includes a differential phase shift keying conversion unit for converting a first bitstream by differential phase shift keying into a second bitstream and a modulation unit for generating a UWB wavelet series based on the second bitstream.

The Chen et al. U.S. Patent Publication No. 2008/0130691 is for a Microsoft Windows BDA digital signal processing system and for a method that can process a non-transport stream. A plurality of analog data packets are received for processing both transport and non-transport signal streams. A splitter receives and duplicates the digital stream to output a first signal stream and a second digital stream. When the second digital stream is a non-transport stream, the non-transport stream controller can transmit it to a storage device, demultiplex and transmit it to a conversion filter. Chen is about broadcast driver architecture (BDA) for digital TV tuning devices. It does not correlate the packets and does not multiply and sum over finite duration any pulses.

None of these prior references mentions a rate conversion and none are summing of correlated pulses. None of the references use multiple pulses (greater than 2) per bit and all possible unique combinations of correlations of pulses mentioned.

The Baker U.S. Patent Publication No. 2005/0078735, unlike the present invention, is for a UWB receiver having a predetermined sequence of pulses stored in memory that is used as a template. The receiver correlates this sequence of pulses with that of the incoming signal much like a RAKE receiver. The sequence of pulses used as a template may be a UWB signal which was captured earlier.

The Piesinger U.S. Patent Publication No. 2010/0253565 is for a TCAS receiver having an antenna to receive an analog signal and an analog to digital converter to convert the analog signal to a digital signal and a field programable gate array using matched filters to match the digital signal to a message to increase the ADS-B squitter sensitivity.

In the present invention the received signals are first processed in an analog circuit and then everything is done digitally over a finite group of samples. The circuit converts the transmitted analog data stream into a digital signal and a digital rate conversion is performed in the process of correlation by the field programmable gate array. The correlation is done with two or more continuous signal streams in which the digital rate conversion is performed in the process of correlation.

The purpose of the present invention is to improve an Ultra Wideband (UWB) digital receiver's performance sensitivity. A key measurement to evaluate a UWB digital receiver's performance sensitivity is Signal to Noise and Distortion Ratio (SINAD). In a communications link, the transmitted signal is degraded by undesired impairments and extraneous signals. The received signal is a superposition of linear additive noise components and nonlinear distortions. Nonlinear distortion comes from a variety of causes, including but not limited to multipath, which not only can distort but also attenuate signals through the different radio frequency phenomena: scattering, reflection, and diffraction. Signal degradation of all these channel impairments result in limiting the potential range of the communications system.

The present invention takes a digitized IF signal output from the ADC which has a finite number of pulses per bit, correlates the pulses and sums the energy of finite duration while reducing the sample rate and then produces all possible combinations of unique correlations of those pulses and finally sums every correlation output together for a cumulative peak detection for severely improved processing gain. The digital signal stream is processed in multiple groups for a multiple pulse per bit varying time delayed correlation.

SUMMARY OF THE INVENTION

The present invention is for a method and apparatus to improve an Ultra Wideband (UWB) digital receiver's performance sensitivity. A transmitted signal stream has each data bit having multiple identical modulated pulses separated by a constant time interval. The received signal stream is applied to a plurality of processing groups in a field programmable gate array where the original signal is duplicated in each processing group to create a second signal stream of identical modulated pulses to the original signal stream in each processing group. The duplicated signal stream in each processing group is delayed by a different constant time interval between modulated pulses and the two signal streams in each processing group is correlated to form one signal stream which is magnitude summed in each processing group and the magnitude summed signals are summed together to form a final signal stream which is detected to improve the sensitivity of the receiver.

The present invention improves an ultra wideband (UWB) digital receiver's sensitivity. A transmitted signal stream having multiple identical pulses per modulated bit has each bit of multiple pulses separated by a constant time interval. The receiver receives the signal stream and duplicates the signal stream in each of a plurality of processing groups forming a duplicate identical signal stream of identical modulated pulses in each processing groups. Each duplicate signal stream within a processing group is delayed by the constant time interval between the identical modulated pulses to thereby align the first pulse of the duplicate signal stream with a pulse of the original signal stream. The signal streams are then correlated and magnitude summed to form a signal stream which is detected to improve the sensitivity of a receiver.

A method of improving an ultra wideband digital receiver's sensitivity includes a receiver receiving a signal stream consisting of multiple modulated pulses representing each data bit with every pulse having a constant pulse repetition interval (PRI). The signal stream having multiple identical modulated pulses for each data bit are then duplicated to create second identical signal streams of identical modulated pulses in each of a plurality of processing groups. The duplicated signal stream in each processing group is then delayed by a time interval of the PRI constant time interval between the matching modulated pulses to thereby align each first modulated pulse of the duplicated signal stream with one of the modulated pulses of the original received signal stream. The signal streams are then correlated and magnitude summed and down-sampling into a single signal stream of modulated pulses which signal stream is then detected by the receiver with improved sensitivity.

An ultra wideband digital receiver with improved sensitivity includes means for receiving an ultra wideband digital signal stream having multiple identical pulses for each data bit with each identical pulse having a constant time interval therebetween. Duplication means within each of a plurality of signal processing groups duplicate each signal stream of the multiple pulses of each data bit into a plurality of separate signal streams of multiple modulated pulse streams. The receiver has means for aligning the plurality of separate signal streams in each signal processing group by delaying one or more duplicate signal streams by the time interval between identical multiple pulses of the received signal stream. The first pulse of a duplicate signal stream is aligned with another pulse of the received signal stream. The receiver has means to correlate the aligned pulses of each of the separated signal streams in each signal processing group and to sum the signal streams from the plurality of signal streams. The receiver then detects the correlated and summed signal streams to improve the sensitivity of the ultra wideband receiver.

BRIEF DESCRIPTION OF THE DRAWINGS

The accompanying drawings, which are included to provide a further understanding of the invention and are incorporated in and constitute a part of the specification, illustrate an embodiment of the invention and together with the description serve to explain the principles of the invention.

In the drawings.

DETAILED DESCRIPTION OF AN EXEMPLARY EMBODIMENT

In order to improve the signal to noise ratio, the present invention exploits the coherence of the received signal to emphasize the signal and deemphasize the random noise. Correlation is a mathematical operation that indicates the degree to which two signal inputs are similar. The general idea is to multiply two signals at different points in time; then, integrate to determine the area under the curve over a finite period.

The Cross-Correlation Operation for one stream:

$$f[n] * g[n] = \sum_{o}^{x} f[u] * g[n+u] \tag{1}$$

$$n = 0, 1, 2, \ldots$$

In the above equation, both f[n] and g[n] are two independently random variables. In a Classic Matched Filter (CMF), the known clean signal is correlated with the received signal that has been corrupted by channel noise and distortions. The known clean signal is a predefined template very similar to the pulse that is transmitted. Unfortunately, since the predefined template is uncorrupted, this method fails to take into account the specific channel properties that result in distorting the received signal. Furthermore, in a mobile communications system, the channel is dynamic and, therefore, ever changing.

A more accurate method of correlation is to compare a received pulse that has been corrupted by a channel's distortions with another pulse that has been corrupted by the very same channel. This provides a higher correlation. In the present invention each received pulse serves as a correlation template for the subsequent pulse. This invention is intended to be used in conjunction with the multiple pulses per bit on-off keying (OOK) modulation technique. A plurality of pulses is transmitted to represent a data bit 1 and the absence of the plurality of pulses represents a data bit 0. Each pulse is transmitted at a constant interval, T_pri. At the receiver, the energy of the plurality of pulses is combined before detection takes place. Since additional pulses are already being transmitted through the same channel, we can utilize the existing modulation scheme to achieve a higher correlation. Delaying the received pulses by T_pri units in time causes the first pulse to align with the second pulse, the second pulse to align with the third pulse, etc. for the correlation of one vector stream.

The Time-Delayed Correlation Operation is shown by:

$$f[n]*f[n+T\_pri]=\Sigma f[u] \cdot f[n+T\_pri+u]n=0,1,2 \qquad (2)$$

where T_pri=pulse repetition interval.

T_pri is equal to the sample rate in mega samples-per-second divided by pulse repetition interval in nanoseconds. For example, if pulses are transmitted every 100 ns and digitally sampled at 1280 msps, then T_pri=1280 msps×2000 ns=2560 clocks. This time-delayed correlation process requires that at least two pulses be transmitted to represent each bit. It will maximize the signal to noise ratio, when used in conjunction with the multiple pulses per bit scheme.

Figure 1:
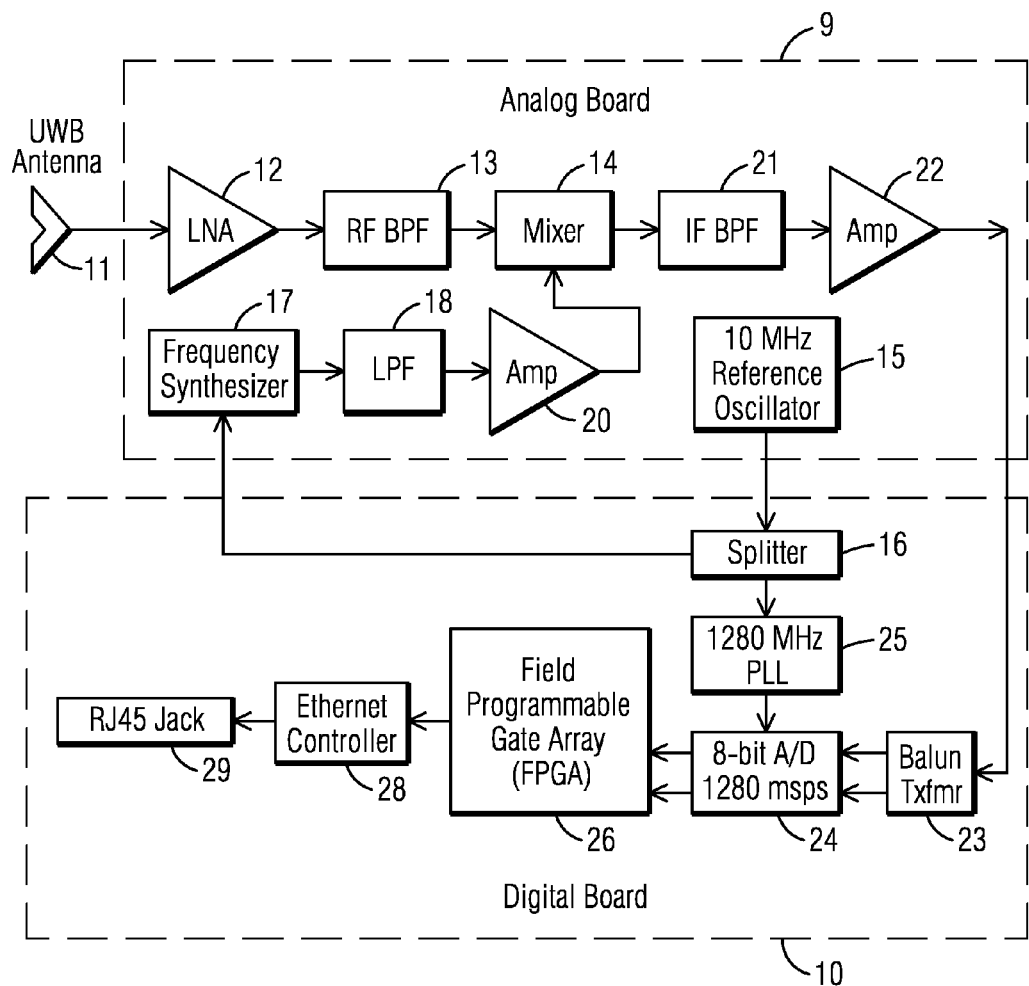
FIG. 1 is a block diagram of an ultra wideband receiver, including the analog and digital boards, in accordance with the present invention.

The present ultra-wideband receiver is a super heterodyne receiver having two boards: an analog board 9 and a digital board 10, along with a power conditioning board (not shown) as shown in FIG. 1. The UWB signal's conditioning, processing, decoding, and time-stamping are done by the analog and digital boards. In the first stage, the output from the receiver antenna 11 feeds directly into the analog board 9, where it is amplified, filtered, and then down converted to an intermediate frequency (IF) centered at 320 MHz. In the second stage the down converted (IF) signal is outputted to the digital board 10 where it is sampled at 1280 msps and fed to a field programmable gate array (FPGA) 24 for digital signal processing. In the FPGA, the sampled IF signal is digitally processed in two primary parts. The first part is where the time-stream delayed correlation is performed. In this part a delayed version of the 1280 msps input stream is created and the original 1280 msps input stream and the new delayed waveform input stream. A PRI of 2000 ns at 1280 msps translates to 2560 clocks (sample rate×PRI→1280 msps×2000 ns/1000). This delays the first waveform by 2560 clocks to create a second waveform so that the second pulse of the first waveform aligns with the first pulse of second waveform. The two waveforms are then multiplied. The output of the multiplier is down-sampled and summed over a finite duration. This is then fed into a low pass filter (LPF) to smooth the waveform. The LPF outputs the signal into the DSP where it is detected, measured, time-stamped, and decoded.

Referring to the drawings and especially to FIG. 1, the ultra-wideband receiver circuit shown is a super heterodyne receiver having two basic circuits, an analog circuit 9 and a digital circuit 10. The power supply is not shown. The ultra wideband (UWB) signal Hz has a pulse repetition interval (PRI) of 2000 ns. The UWB signal's conditioning, processing, decoding, and time-stamping are done by the analog and digital circuits.

In the first stage, as seen in FIG. 1, the analog circuit 9 receives the output from the receiver antenna 11 which then amplifies the signal in a low noise RF amplifier 12 (LNA) and filters the signal through an 6.25 GHz RF bandpass filter 13 (RF BPF) and then down converts the signal to an intermediate frequency (IF) in the mixer 14. The mixer 14 is being fed a 6.57 GHz continuous wave (CW) signal generated by the synthesizer 17 which is filtered in the low pass filter 18 and amplified in RF amp 20. The output from the mixer 14 is filtered through a 320 MHz band pass filter 21, amplified in RF-amp 22, converted to a differential signal in a TXFm Balun 23 and then sampled in an 8-bit analog to digital (A/D) converter 24 at 1280 mega samples per second sampling. The A/D converter 24 also receives a clock signal from the 1280 MHz phase locked loop (PLL) 25. Both the 1280 MHz phase locked loop (PLL) 25 and the synthesizer 17 are referenced by a 10 MHz clock generated by the 10 MHz Reference Oscillator 15 going through the RF splitter 16.

Figure 2:
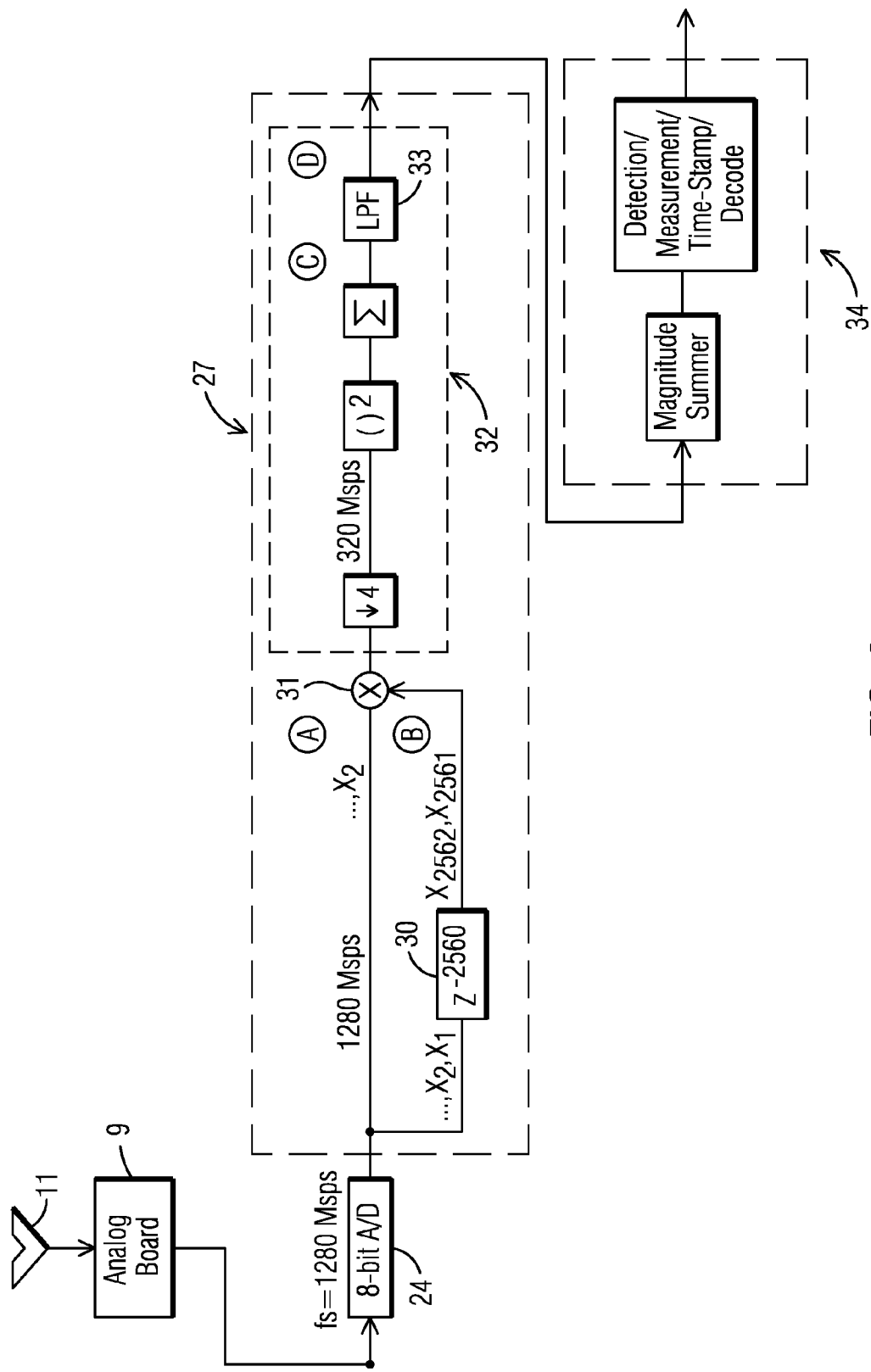
FIG. 2 is the digital board signal flow diagram.

FIG. 2 is a digital signal flow path for the digital board 10.

The down converted IF signal is fed into the digital circuit 10, as seen in FIGS. 1 and 2, where it is sampled at 1280 Mega samples per second in the A/D converter 24 and fed to an Altera Stratix field programmable gate array (FPGA) 26 for digital signal processing. In the FPGA 26, the sampled IF signal is digitally processed. The time-domain delayed correlation is performed in the FPGA 26. The decoded signal is transmitted out the ethernet controller 28 to an output RJ 45 jack 29.

The signal stream through the digital board 10 can be followed in FIG. 2 in which a delayed version of the 1280 MSPS input stream is delayed by the 2560 MSPS clock 30 and is added to the original 1280 MSPS input stream. The pulse repetition interval (PRI) of 2000 ns at 1280 MSPS translates to 2560 clocks (sample rate×PRI=1280 MSPS×2000 ns/1000).

Thus the original waveform is delayed by 2560 clocks to create the second waveform, such that the second pulse of the original waveform aligns with the first pulse of the second waveform. The third pulse of the original waveform aligns with the second pulse of the second waveform, etc. The two wave streams are then multiplied in multiplier 31 and the output of the multiplier is fed to the rate converter/correlator 32 and down sampled and summed over a finite duration and fed into the low pass filter (LPF) 33 to smooth the waveform which is outputted to the digital signal processing (DSP) block 34 where it is detected, measured, time sampled and decoded.

Figure 3:
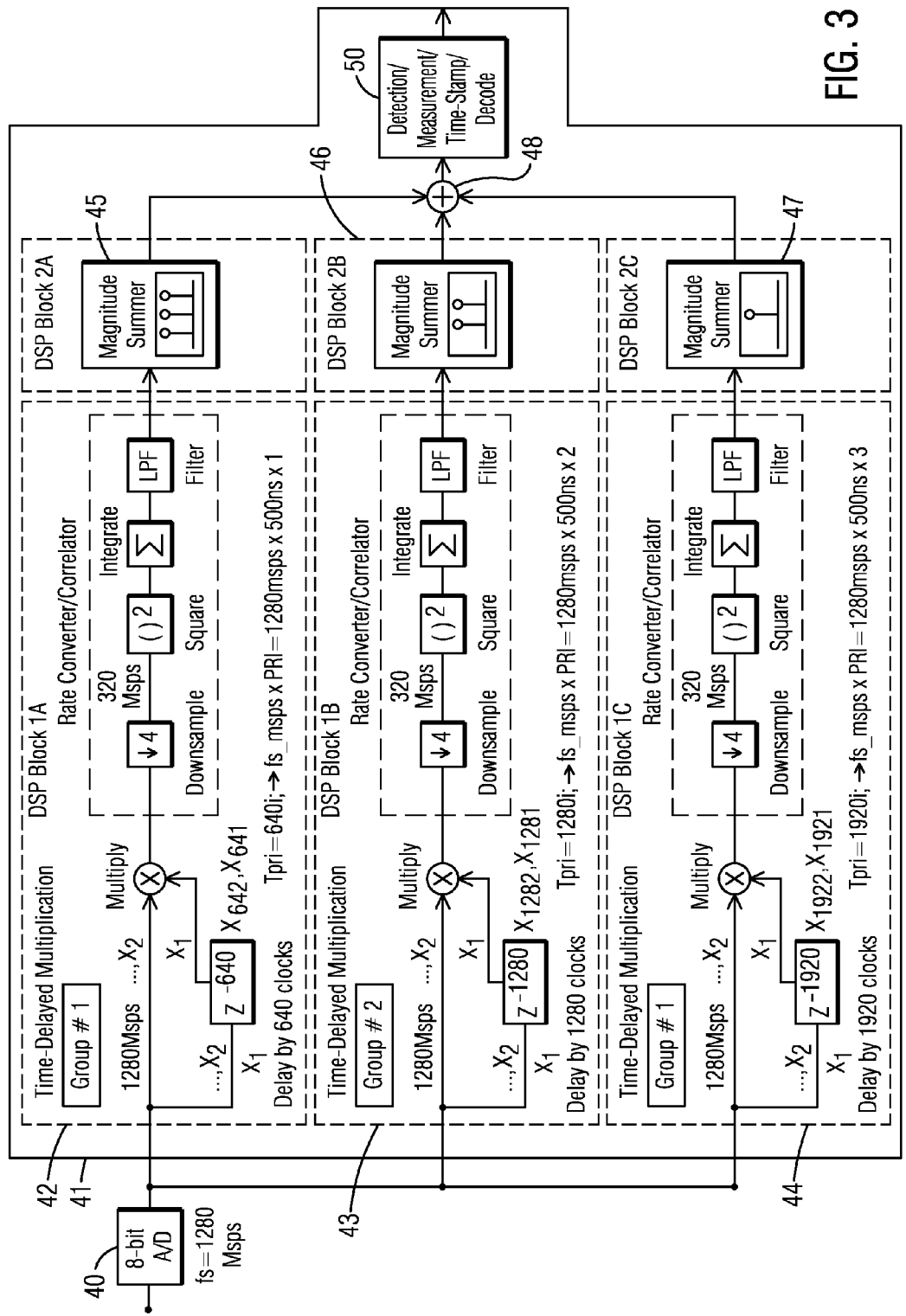
FIG. 3 is a digital circuit diagram for a varying time delayed correlation for making a plurality of correlation vector streams between pulses for a particular bit.

In FIG. 3 the signal stream has multiple digital processor groups (42, 43, 44) of correlation streams, the number of groups depend on the number of identical modulated pulses, "n", in each data bit. The number of groups of correlation vector streams being (n–1) where n is the number of pulses in each bit. Thus as seen in the example of FIG. 3, a 4 pulses per bit received signal stream received from the 8 bit A/D 40 is applied to three signal processing groups (42, 43, 44) of correlation vector streams in a field programmable gate array 41. The digital signal stream is applied to each DSP digital signal process group (42, 43, 44) (block 1A, 1B and 1C in the drawing) where the signal stream in each group is processed in the same manner as in FIG. 2. The signal stream has a duplicate signal steam in each digital processing group of the input signal stream which duplicate signal stream is time delayed relative to the original signal stream. The delay in the first signal stream is by a multiple of the pulse repetition interval. FIG. 3 shows a 4 bit pulse per bit signal, the first signal processing group 42, (Block 1A), duplicate signal is delayed by 640 clocks while the signal processing group 43, (Block 1B), is delayed by 1280 clocks and the signal processing group 44, (Block 1C), is delayed by 1920 clocks. Each group has its own magnitude summing block 45, 46, and 47 which produces a vector that sums all correlated pulses from the stream. Each magnitude vector steam is then summed (48) together for a final vector which the detection/measurement/time stamp/decoding 50 actually takes place. It will be clear that while a 4 pulse per bit example has been shown, that any number of pulses (n) can be formed using (n−1) groups.

Initially a group of n=4 pulses was shown correlating a pulse with the successive pulse immediately after, providing 3 unique correlations per bit (1 less that the number of pulses per bit) and then summing those 3 pulses for detection. However, now every possible combination of correlations over a group of pulses are calculated. For instance, in a group of 4 pulses representing 1 bit, there are a total of 6 possible unique correlations between those 4 pulses (3 of them are produced by the first correlation processing group 42, 2 of them are produced by the second correlation processing group 43; 1 is produced by the third correlation processing group 44). The formula for the number of possible correlations per bit is (n−1)×n/2, where n=number of pulses per bit. By calculating every possible combination of correlations and summing the resultant correlated streams gives the cumulative sum of the energy of every correlation from every stream.

The down converted IF signal from the A/D converter is fed into the digital circuit digital signal processor 41 where it is sampled at 1280 million samples per second and fed to an Altera Stratix field programmable gate array (FPGA) 41 for digital signal processing. In the FPGA 41, the sampled IF signal is digitally processed in multiple groups. The time-domain delayed correlation for each group is performed in the FPGA 41.

The signal stream through the FPGA 41 can be followed in FIG. 3 in which a delayed version of the 1280 MSPS input stream has a time-delayed multiplication in each signal processing group (42, 43, 44) which is added to the original 1280 MSPS input stream in each group.

FIG. 3 of the drawing is an example of a 4 pulses per bit but can easily be expanded for any number of pulses per bit. In a 4 pulses representing 1 bit, n=4 (number of pulses per bit) then (n−1)=3 groups. (N−1)×(n)/2 forms 6 possible correlations per bit. Group 1 produces 3 correlation per bit, Group 2 produces 2 correlations per bit, and group 3 produces 1 correlation per bit.

If 12 pulses represent one bit, then n=12 and (n−1)=11 groups. Then (n−1)×(n)/2 can form 66 possible unique correlations, so that 11 groups (n−1) produce 66 correlations per bit. All possible correlations are then added together for a more robust detection.

It should be clear at this point that an ultra wide-band digital receiver's performance sensitivity has been improved by a digital time delayed correlation of the received signal. However the present invention is not to be construed as limited to the forms shown which are to be considered illustrative rather than restrictive.

We claim:

1. A method of improving an ultra wideband digital receiver's sensitivity comprising the steps of:
receiving a digital signal stream having multiple identical modulated pulses representing each data bit and having a constant time interval therebetween;
applying the received signal stream to a plurality of simultaneous signal processing groups;
duplicating the signal stream having multiple identical modulated pulses for each data bit in each signal processing group forming two signal streams of identical modulated pulses each having multiple identical modulated pulses for each data bit in each signal processing group;
delaying each said duplicate signal stream in each of said plurality of signal processing groups by a predetermined time to align each first modulated pulse in the same bit of modulated pulses of each of said signal processing group duplicate signal stream with one modulated pulse of the original signal stream, each said first modulated pulse in the same data bit of modulated pulses of each said signal processing group aligning with a different modulated pulse of the original signal stream from that of the other of said plurality of digital processing groups;
correlating each of said two signal streams of identical modulated pulses in each signal processing group to produce an output therefrom;
magnitude summing the output of each said signal processing groups;
summing together each of said magnitude summed signal streams to form a final signal stream; and
detecting said summed magnitude signal stream;
thereby improving the sensitivity of a receiver.

2. The method of improving an ultra wideband receiver's sensitivity in accordance with claim 1 in which the number of said plurality of signal processing groups equals the number of modulated pulses in each data bit minus one.

3. The method of improving an ultra wideband receiver's sensitivity in accordance with claim 1 having three signal processing groups.

4. The method of improving an ultra wideband receiver's sensitivity in accordance with claim 1 in which said duplicate signal stream of said original signal stream in each of said plurality of signal processing groups is delayed progressively by integer multiples of the time repetition interval of the modulated pulse.

5. The method of improving an ultra wideband receiver's sensitivity in accordance with claim 1 in which the step of delaying one said signal stream in each signal processing group includes delaying each said duplicated signal stream in each signal processing group by multiples of the constant time interval of the received signal stream in each of said signal processing groups to thereby align each modulated pulse of said duplicated signal stream data bit with one of the modulated pulses of the original signal stream data bit in each signal processing group.

6. The method of improving an ultra wideband receiver's sensitivity in accordance with claim 1 in which said signal streams are processed in said plurality of signal processing groups in a field programmable gate array.

7. A method of improving an ultra wideband digital receiver's sensitivity comprising the steps of:
receiving a signal stream having multiple identical modulated pulses representing each data bit, each of said signal stream received data bits having a constant time interval therebetween;
applying the received signal stream to a plurality of simultaneous signal processing groups;
duplicating said received signal stream having multiple identical modulated pulses for each data bit in each of said plurality of signal processing groups;
delaying said duplicate signal stream in each signal processing group relative to said original signal stream in each signal processing group to align at least one delayed duplicate signal stream modulated pulse in a data bit with one original signal stream modulated pulse in a data bit in each single processing group thereby aligning offset modulated pulses of identical signal streams in each signal processing group;

correlating the aligned modulated pulses in each signal processing group to form a single signal stream output in each signal processing group;

magnitude summing the output of each said signal processing group;

summing together each of said magnitude summed signal streams to form a final signal stream; and detecting said final signal stream to thereby improve the sensitivity of a receiver.

8. The method of improving an ultra wideband receiver's sensitivity in accordance with claim 7 in which said original received signal stream and each said duplicated signal stream has a plurality of identical modulated pulses for each data bit and said duplicated signal stream in each signal processing group is delayed to align the first modulated pulse of said duplicate signal stream with a different one of the modulated pulses of the original signal stream for each signal processing group.

9. The method of improving an ultra wideband receiver's sensitivity in accordance with claim 7 in which the number of said plurality of signal processing groups equals the number of modulated pulses in each data bit minus one.

10. The method of improving an ultra wideband receiver's sensitivity in accordance with claim 9 having three signal processing groups.

11. The method of improving an ultra wideband receiver's sensitivity in accordance with claim 7 in which each said duplicate signal stream of said original signal stream in each of said plurality of signal processing groups is delayed progressively by integer multiples of the time interval of the modulated pulse.

12. The method of improving an ultra wideband receiver's sensitivity in accordance with claim 7 in which the step of delaying one said signal stream in each signal processing group includes delaying each said duplicated signal stream by multiples of the constant time interval of the received signal stream in each of said signal processing groups to thereby align each modulated pulse of said duplicated signal stream data bit with one of the modulated pulses of the original signal stream data bit in each signal processing group.

13. A method of improving an ultra wideband digital receiver's sensitivity comprising the steps of:

receiving an analog signal stream having multiple identical modulated pulses representing each data bit and having a constant time interval therebetween;

processing the received analog signal stream in an analog signal processing circuit and outputting the processed analog signal stream to a digital processing circuit;

converting the outputted analog signal stream to a digital signal stream;

duplicating the digital signal stream having multiple identical modulated pulses for each data bit in a field programable gate array circuit to form two digital signal streams of identical modulated pulses each having multiple identical modulated pulses for each data bit;

delaying said duplicate signal stream of said original signal stream in said field programable gate array circuit by a predetermined time to align each first modulated pulse of said duplicate signal stream with the second modulated pulse of the original signal stream;

correlating said two digital signal streams of identical modulated pulses in said field programable gate array circuit to form a digital single signal stream having one modulated pulse representing each data bit and down-sampling and summing said digital signal stream over a finite duration; and detecting said single digital signal stream, thereby improving the sensitivity of a receiver.

14. An ultra wideband digital receiver having improved sensitivity comprising:

means for receiving an ultra wideband digital signal stream having multiple identical data pulses for each data bit and a constant time interval therebetween;

means for duplicating said received digital signal stream to form a second identical digital signal stream to said received digital signal stream and having multiple identical data pulses for each data bit and a constant time interval therebetween;

means for aligning the duplicated digital signal stream with the received digital signal stream by delaying the duplicated digital signal stream by the constant time interval of the received digital signal stream to thereby align delayed pulses of the duplicated digital signal stream with the pulses of a received digital signal stream whereby each data pulse of the delayed duplicated digital signal stream acts as a correlation template for the received signal stream; and a field programmable gate array circuit for correlating the duplicate digital signal stream and the received digital signal stream to form one digital signal stream which digital signal stream is down-sampled and summed over a finite duration and detected, measured and time stamped;

thereby improving the sensitivity of an ultra wideband receiver.

\* \* \* \* \*